United States Patent
Ramakrishna et al.

(10) Patent No.: US 10,419,294 B2
(45) Date of Patent: Sep. 17, 2019

(54) ENTITY-STATE RELATIONSHIP CORRELATION

(71) Applicant: CISCO TECHNOLOGY, INC., San Jose, CA (US)

(72) Inventors: Rahul Ramakrishna, San Jose, CA (US); Yathiraj B. Udupi, San Jose, CA (US); Ralf Rantzau, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 135 days.

(21) Appl. No.: 15/278,740

(22) Filed: Sep. 28, 2016

(65) Prior Publication Data

US 2018/0091376 A1    Mar. 29, 2018

(51) Int. Cl.
*H04L 12/24* (2006.01)
*H04L 12/26* (2006.01)
*H04L 29/08* (2006.01)
*H04L 12/801* (2013.01)

(52) U.S. Cl.
CPC ........ H04L 41/142 (2013.01); H04L 43/0817 (2013.01); *H04L 41/22* (2013.01); *H04L 47/127* (2013.01); *H04L 67/02* (2013.01)

(58) Field of Classification Search
CPC ........ H04L 41/142; H04L 47/20; H04L 67/02
See application file for complete search history.

(56) References Cited

U.S. PATENT DOCUMENTS

| | | | | |
|---|---|---|---|---|
| 7,131,037 B1* | 10/2006 | LeFaive | ............. | H04L 41/0631 714/46 |
| 9,166,997 B1* | 10/2015 | Guo | .................. | H04L 63/1433 |
| 2002/0152185 A1* | 10/2002 | Satish Jamadagni | .. | G06N 7/005 706/1 |
| 2005/0091356 A1* | 4/2005 | Izzo | .................... | H04L 41/0604 709/223 |
| 2005/0172306 A1* | 8/2005 | Agarwal | ............... | G06F 11/008 719/328 |
| 2010/0050023 A1* | 2/2010 | Scarpelli | ............ | G06F 11/0709 714/46 |
| 2010/0180092 A1 | 7/2010 | Rajaa et al. | | |
| 2015/0236893 A1* | 8/2015 | Twiddy | .................. | H04L 41/06 709/223 |
| 2016/0379276 A1* | 12/2016 | Ruggiero | ............... | G06Q 10/06 705/14.71 |
| 2017/0063762 A1* | 3/2017 | Machol | .................... | H04L 51/18 |
| 2017/0249199 A1* | 8/2017 | Tripathi | ................ | G06F 11/079 |
| 2017/0279687 A1* | 9/2017 | Muntes-Mulero | .... | H04L 41/065 |

\* cited by examiner

*Primary Examiner* — Michael A Keller
*Assistant Examiner* — Jsing Forng Lin
(74) *Attorney, Agent, or Firm* — Polsinelli PC

(57) ABSTRACT

In an example, there is disclosed a logging server computing apparatus, having: a processor; a memory; and a logging engine to: analyze a network; build an entity-state matrix M from an entity vector e and a state vector s; determine that there is a strong correlation between an entity $e_c$ and a state $s_c$; and report the strong correlation.

20 Claims, 7 Drawing Sheets

ENTITY-STATE RELATIONSHIP CORRELATION

FIELD OF THE SPECIFICATION

This disclosure relates in general to the field of computing, and more particularly, though not exclusively to, a system and method for providing entity-state relationship correlation.

BACKGROUND

Data centers are a common fixture in computing ecosystems, and especially in cloud computing. Data centers may have many commoditized resources such as processors, data storages, and even network links. The commoditized resources can fail or become overloaded. In that case, it is beneficial to have an agile system wherein resources can quickly be redistributed, and new resources can be brought online. To that end, a software-defined networking (SDN) architecture may be provisioned to provide a cloud backbone.

Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). SDN may require a method for the control plane to communicate with the data plane.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
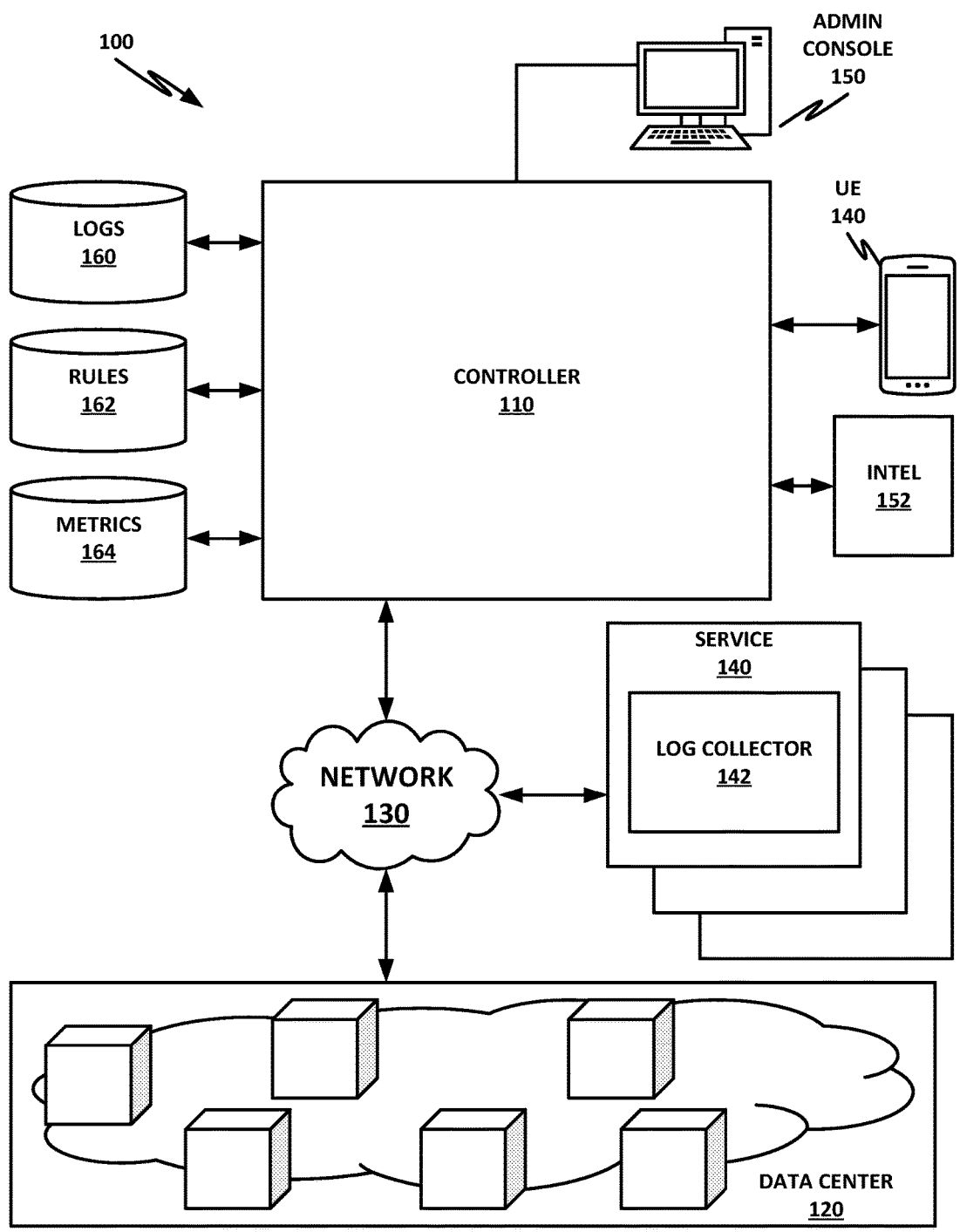
FIG. 1 is a block diagram of a cloud ecosystem according to one or more examples of the present specification.

In an example, there is disclosed a logging server computing apparatus, having: a processor; a memory; and a logging engine to: analyze a network; build an entity-state matrix M from an entity vector e and a state vector s; determine that there is a strong correlation between an entity $e_c$ and a state $s_c$; and report the strong correlation.

There is further disclosed an example, wherein the logging engine is further to construct an entity-state graph.

There is further disclosed an example, wherein reporting the strong correlation comprises providing the entity-state graph in a human-readable graphical form.

There is further disclosed an example, wherein building the entity-state matrix comprises normalizing the entity-state matrix.

There is further disclosed an example, wherein normalizing the entity-state matrix comprises constructing an entity-centric matrix $M_E$.

There is further disclosed an example, wherein normalizing the entity-state matrix comprises constructing an state-centric matrix $M_S$.

There is further disclosed an example, wherein determining that there is a strong correlation comprises determining that a normalized vector value is close to 1 within a threshold.

There is further disclosed an example, wherein determining that there is a strong correlation comprises determining that there is a strong positive correlation.

There is further disclosed an example, wherein determining that there is a strong correlation comprises determining that there is a strong negative correlation.

There is further disclosed an example, wherein reporting the strong correlation comprises providing an actionable rule.

There is further disclosed an example of a computer-implemented method of providing logging for a network, comprising: analyzing the network; building an entity-state matrix M from an entity vector e and a state vector s; determining that there is a strong correlation between an entity $e_c$ and a state $s_c$; and reporting the strong correlation.

There is further disclosed an example, further comprising constructing an entity-state graph.

There is further disclosed an example, wherein reporting the strong correlation comprises providing the entity-state graph in a human-readable graphical form.

There is further disclosed an example, wherein building the entity-state matrix comprises normalizing the entity-state matrix.

There is further disclosed an example, wherein normalizing the entity-state matrix comprises constructing an entity-centric matrix $M_E$.

There is further disclosed an example, wherein normalizing the entity-state matrix comprises constructing an state-centric matrix $M_S$.

There is further disclosed an example, wherein reporting the strong correlation comprises providing an actionable rule.

There is further disclosed an example of one or more tangible, non-transitory computer-readable storage mediums having stored thereon executable instructions for providing a logging engine for: analyzing a network; building an entity-state matrix M from an entity vector e and a state vector s; determining that there is a strong correlation between an entity $e_c$ and a state $s_c$; and reporting the strong correlation.

There is further disclosed an example, wherein building the entity-state matrix comprises normalizing the entity-state matrix.

There is further disclosed an example, wherein normalizing the entity-state matrix comprises constructing an entity-centric matrix $M_E$ or a state-centric matrix $M_S$.

There is further disclosed an example of one or more tangible, non-transitory computer-readable storage mediums having stored thereon executable instructions for instructing one or more processors for providing a logging engine operable for performing any or all of the operations of the preceding examples.

There is further disclosed an example of a method of providing a logging engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A data center has many different types of resources (virtual or physical) operating together to provide services to users and clients. To allow an administrator to monitor the state or health of a data center, logs logging activity or events in the data center and metrics representing certain performance or state of resources are reported to an administrator. Since there are many resources in a data center, administrators are often inundated with streams of logs and metrics, making it difficult for a human administrator to monitor and identify problems in the data center. When an administrator can not readily identify and perform actions to address problems before or soon after they occur, services running in the data center can suffer from limitations on performance, or worse yet, partial or total system failure. To address the issue, systems can implement one of two ways to help administrators determine if there are problems in the data center.

One way to make it easier for administrators to understand logs and metrics is to allow administrators to define rules that trigger alerts to be sent and/or displayed to the administrator. A rule-based alert can be generated when a metric meets a particular condition (e.g. CPU utilization>90%), and the metric is being monitored in real time. These rules can be in the form of a predefined threshold (i.e., condition) on a particular metric. An administrator no longer has to manually review logs for problems, and the rules can check for certain conditions in the metrics for the administrator. The workload to be done by the administrator is greatly reduced. However, this approach can be problematic in some scenarios. The effectiveness of rule-based alerts largely depends on the domain expertise of the administrator. If rules are defined narrowly, rules may not capture all potential problems in the data center. If rules are defined broadly, rules may generate too many alerts. Given the scale of the data center (or multiple data centers) being monitored, the administrator can be overwhelmed with the large number of alerts at any given instant.

Another way to make it easier for administrators to understand logs and metrics is the use of anomaly detection. Anomaly detection monitors a data center by identifying (statistical) anomalies in the logs or metrics. Specifically, anomaly detection automatically identifies deviation from normal behavior for the metrics being monitored. When deviation or anomalous behavior is identified, an alert is generated for an administrator. Whereas rule-based alerting leverages the domain knowledge and expertise of the administrator who is responsible for defining those rules, anomaly detection leverages machine learning and statistical analysis to understand normal behavior and attempt to identify abnormal patterns in the logs and metrics. However, one downside of anomaly detection is that anomaly detection based alerting can potentially lead to many false alarms since they typically do not incorporate domain specific intelligence. False alarms waste administrator time and effort in addressing problems that do not exist, or worst yet, false alarms obfuscate actual problems in the data center.

When a resource fails or becomes overloaded, it is important for an administrator or management system to be notified such that appropriate actions can be taken to ensure system up time, maintain quality of service requirements, and reduce further failures. However, creating actionable metrics and notifications is a non-trivial task. Notifications can often be in a form of logs, metrics, or alerts. In a large network, system administrators can be overwhelmed by notifications, updates, reports, and logs, all of which may include a large and unmanageable volume of data When data centers grow larger, so do the volume of notifications. Applications, VMs, and infrastructure in a cloud platform, for example, generate huge amounts of logs. It is extremely cumbersome and difficult for a human administrator to review all notifications, and management systems sometimes lack the intelligence to understand notifications and report of anomalies efficiently.

To alleviate this cumbersome load on system administrators, the present specification describes an automated log analysis tool configured to identify domain-specific entities of the system and identify correlations to associated states. The tool can then provide a simple graphical, entity-state based representation of a current snapshot of a system. This provides to system administrators and DevOps key insights from the massive logs generated by different systems in the cloud platform. The system provides a concise representation of logs, and a simple alert specification method that in one embodiment can be agnostic of domain-specific information. The can help administrators cope with infrastructures that scale in or out over time.

As used throughout this specification, an entity can include any "object," such as a network object, or any other object that may show up in a log file, to which an event can happen. Nonlimiting illustrative examples of entities include an internet protocol (IP) address (e.g., "10.0.0.X"), hostnames, protocols, and index names.

As used throughout this specification, a "state" can include any event that may happen to an entity or object. While some states may be neutral (e.g., "logged" could be a state, but says nothing about success or failure), in some embodiments, states may be further classified as "positive states" and "negative states."

For example, positive states may include such terms as "success," "complete," "delivered," "acknowledged," or "HTTP 200" by way of nonlimiting example.

Negative states may include such terms as "failure," "incomplete," "delivery failed," "NAK," "HTTP 404," "warning," "segmentation fault," "timeout," or "connection failed" by way of nonlimiting example.

In certain embodiments of the present specification, positive and negative states can be manually added, or they may be learned from a semi-supervised machine learning method.

Embodiments of the present specification may include a logging engine, which is configured to collect, record, and analyze logs, and to identify entity-state correlations that can be useful for providing actionable information to a system administrator. The logging engine may then report the most useful actionable correlations to the system administrator.

To this end, after identifying domain-specific entities and learning the states associated with them, the logging engine may then generate an entity-state matrix M=e×s, where e is a number of entities in an entity vector, and s is a number of states in a state vector. In an example, entities and states can be associated or otherwise correlated by applying a "scoring" function over logs. The input function takes entities and states as parameters and outputs a positive integer as a score using, for example, the following combination of techniques:
   a. Frequency of entities in a given time interval
   b. Co-occurrence count for all entities against the states
   c. Word distance between entities and states Based on the associations between entities (objects) and states (events), scores can be normalized to identify the relative strength of the correlation between entities and states. For example, correlations may be normalized to "entity-centric" (i.e., "What events happened to this entity?"), or "event-centric," (i.e., "What entities experienced this event?"), as follows.

For "entity-centric" normalization, process the matrix edge, row by row. The logging engine scales down the score values to real numbers between [0,1], where the maximum value is assigned the value 1 if it exists, otherwise all are assigned 0. Similarly, for "state-centric" normalization, process the state matrix, column by column, and map the values in the same way to the real interval [0,1].

For example, consider the following entity-state matrix M:

|        | State |    |    |    |    |
|        | S1 | S2 | S3 | S4 | S5 |
| Entity |    |    |    |    |    |
|--------|----|----|----|----|----|
| E1     | 5  | 0  | 7  | 2  | 3  |
| E2     | 0  | 0  | 3  | 8  | 0  |
| E3     | 5  | 1  | 0  | 10 | 7  |

$M_S$ (normalized by state)

|        | State |     |     |     |     |
|        | S1  | S2  | S3  | S4  | S5  |
| Entity |     |     |     |     |     |
|--------|-----|-----|-----|-----|-----|
| E1     | 0.5 | 0.0 | 0.7 | 0.1 | 0.3 |
| E2     | 0.0 | 0.0 | 0.3 | 0.4 | 0.0 |
| E3     | 0.5 | 1.0 | 0.0 | 0.5 | 0.7 |

$M_E$ (normalized by entity)

|        | State |     |     |     |     |
|        | S1  | S2  | S3  | S4  | S5  |
| Entity |     |     |     |     |     |
|--------|-----|-----|-----|-----|-----|
| E1     | 0.3 | 0.0 | 0.4 | 0.1 | 0.2 |
| E2     | 0.0 | 0.0 | 0.3 | 0.7 | 0.0 |
| E3     | 0.2 | 0.1 | 0.0 | 0.4 | 0.3 |

The logging engine may then generate a graph so that the system administrator can dynamically visualize an object graph G(v,e), where the vertices (v) are entities and states, and there is an edge (e) between a state-entity pair if the associated score in the matrix is greater than 0. Note that in this example, the graph has no edges between entities or states themselves. Additional details of such a graph are illustrated in FIG. 6.

The logging engine also provides a domain-agnostic alerting specification so that an administrator or DevOps can define alerts from the entity-state graph. The logging engine continuously updates the entity-state matrix while new log messages are detected in the system. In some embodiments, the frequency of updates can be flexibly specified by the system administrator.

The alert generation continuously observes changes in the entity-state matrix to determine if conditions are met to trigger an alert message. An alert message may be triggered when a sufficiently strong correlation is observed between an entity and a state (from either an entity-centric point of view, or from a state-centric point of view). In this context, "sufficiently strong" may mean that the correlation is "close" to 1, where "close" is defined as being within a specified threshold. The exact threshold will depend on the specific context. Depending on the context, "strong" may be as low as approximately 0.5. In other contexts, stronger correlations will be required before an alert is triggered. Other values for "strong" may include values equal to or greater than approximately 0.6, 0.7, 0.8, and 0.9. In other examples, concern may be raised when a positive correlation is too low (e.g., the entity is not reporting "success" sufficiently often). In those cases, the complements of the foregoing may be used. For example, a failure rate at or below 0.1, 0.2, 0.3, 0.4, or 0.5 may be deemed acceptable.

Figure 6:
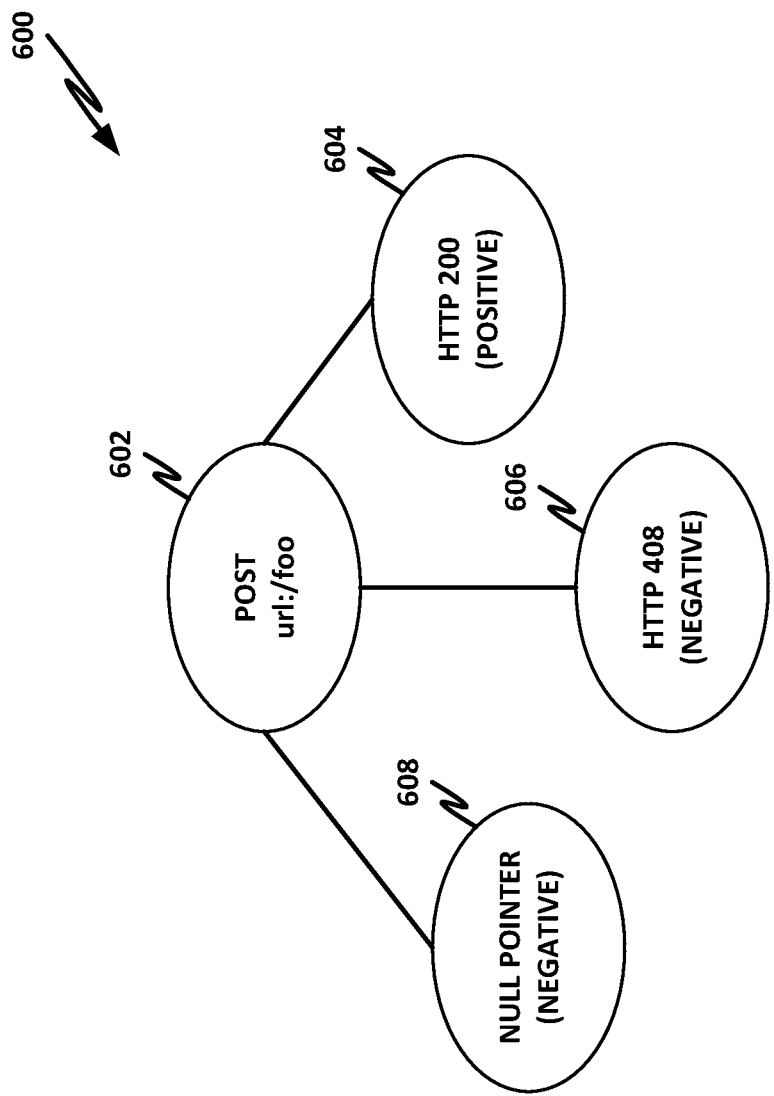
FIG. 6 is an example entity-state graph according to one or more examples of the present specification.

When a strong correlation is observed, in some cases the entity-state graph may be provided to a system administrator in a human-readable graphical form, such as the form disclosed by way of nonlimiting example in FIG. 6. This may provide an actionable alert. For example, if a strong negative correlation is observed for a specific entity, the network administrator may take action such as inspecting the node to determine if it is down or faulty.

Alert specification patterns may be used to formulate alerts on entity-state graphs. For example, DevOps staff might specify the following example alerts for a given entity-state graph:

Example 1: Critical API Endpoint

If the edge weight between entity E1 ("POST://foo") and state S1 ("HTTP 200") goes below 0.5 of all states it is associated with, send an alert.
If Entity(E1).cost(S1)<0.5: Send alert Example 2: Service is Down If the relation between the entity E2 ("auth:service") and state S2 ("success") does not exist, send an alert.
If not Entity(E2).relation(S2): Send alert In the above two cases, entity is treated as root node of the graph and the edge_weight is the cost it takes to traverse from the entity to the states.

Example 3: System Health

At any point in time, if the total sum of the edge weights of negative states connected to an entity is greater that the positive states, the entity is considered to be in a poor state of health and needs further investigation by DevOps staff. If sum(weights to associated negative states for Entity E1)>sum( . . . positive states . . . ): Send alert The visual representation of logs (for example, as illustrated in FIG. 6) summarizes the system's state, greatly simplifies the definition of log alerts, and allows for effective monitoring of the health of the system. This provides advantages over logging systems that provide only generic or acute alerting. For example, some logging systems are based on the administrator crafting regular expressions to search for strings that match a known pattern. However, such logs are vulnerable to the "unknown unknown." In other words, the administrator may not even know that there are patterns he is missing.

In the system of the present specification, the system administrator can see relationships graphically, and thus may be able to recognize correlations that would not be visible otherwise. The system administrator can fetch a list of states associated with each entity, and thus more easily and effectively craft actionable alerting rules based on the current system.

This method also makes it easier to adapt to systems that are continuously scaling in and out (based on number of instances), such as an SDN, where the state of the network may change frequently.

For example, it is valuable to learn about the presence of newly-discovered states for an entity, as in Example 3 above. This enables the user to more easily derive insights from logs, versus looking at a long, dense string of text.

Users may also be able to formulate effective alert conditions in a shorter time by identifying relevant dependencies between entities and states. For example, a highly weighted edge between nodes labelled "HTTP 404" and "http://api.company.com/foo?x=5" indicates that this API method causes an inordinate number of failures, and should be investigated. This provides a greater ability to quickly react to future or unknown negative system events, and to mitigate their effects quickly.

A system and method for entity-state correlation will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of an example cloud ecosystem 100 according to one or more examples of the present specification. Cloud ecosystem 100 is an embodiment of one non-limiting example of a system and method for providing entity-state relationship correlation.

Figure 4:
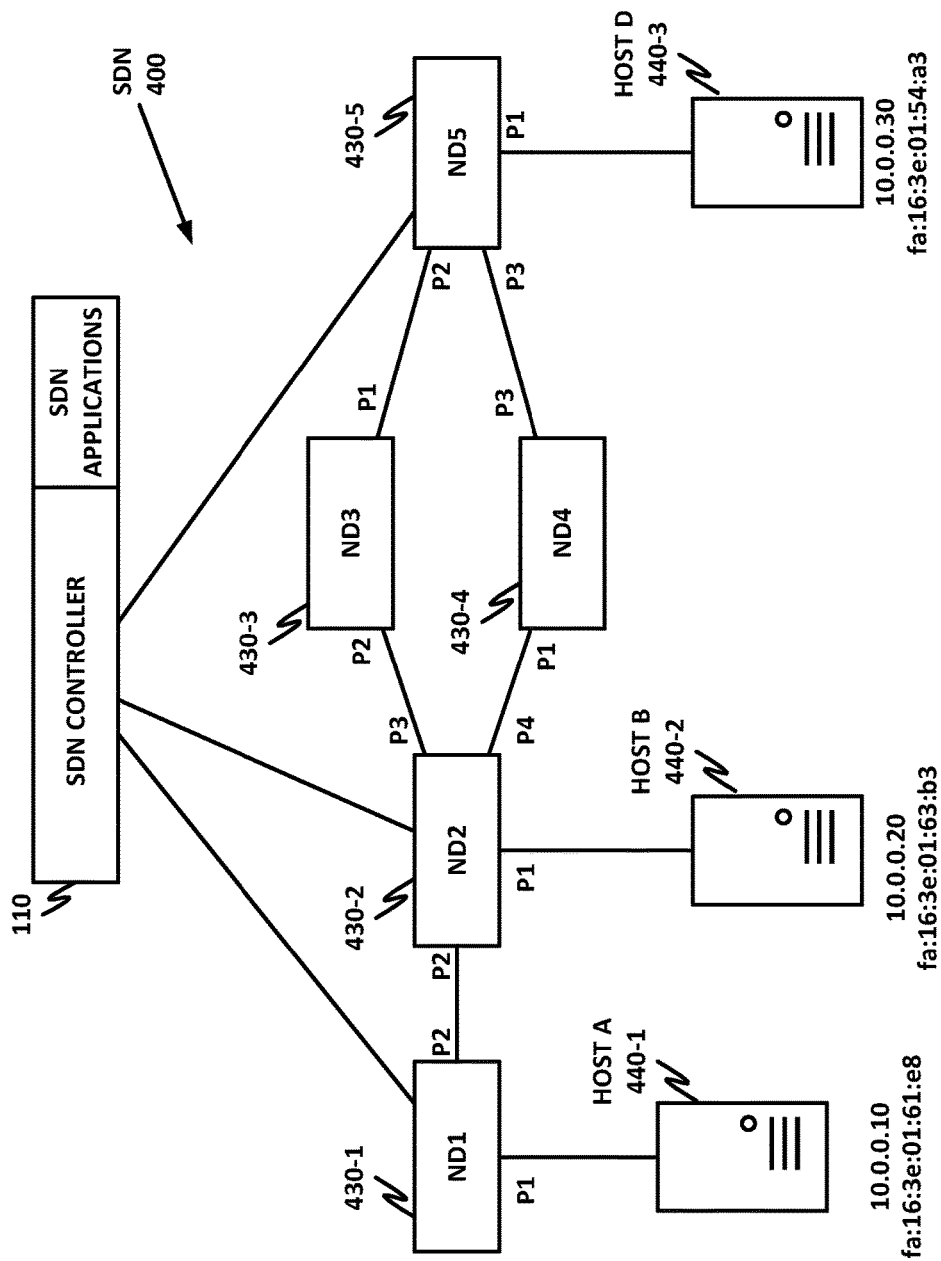
FIG. 4 is a block diagram of a software-defined network (SDN) according to one or more examples of the present specification.

In this embodiment, cloud ecosystem 100 includes a controller 110 for providing logging in data center 120. In certain embodiments, such as those in which data center 120 is an SDN as illustrated in FIG. 4, controller 110 may be an SDN controller (SDN-C). However, not all controllers 110 need necessarily be SDN-Cs, and not all SDN-Cs are configured to function as a controller 110. Thus, the illustrated embodiment should be understood as a non-limiting example, disclosed for the purpose of facilitating discussion and aiding in understanding the present disclosure.

Controller 110 may communicate with various resources of data center 120 (illustrated as cubes) via a network 130. Each resource or manager(s) of said resources can be associated with one or more services 140 implementing a log collector 142 for providing real-time logs and/or metrics associated with the resources to controller 110. Controller 110 can also communicate with the one or more services 140, via the network 130, or via another network not shown in FIG. 1. Log collector 142 can provide real-time logs and/or metrics associated with resources in data center 120, and associated with data center 120 in part or as a whole, to controller 110. To generate logs and/or metrics related to data center 120, services 140 could be communicatively connected to data center 120 directly, via network 130, or via another network not shown in FIG. 1.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Cloud ecosystem 100 may include a configuration capable of transmission control protocol/internet protocol (TCP/IP) communications for the transmission and/or reception of packets in the network. Cloud ecosystem 100 may also operate in conjunction with a user datagram protocol/IP (UDP/IP), any other suitable protocol, or any suitable combination thereof where appropriate and based on particular needs. For purposes of illustrating the techniques of the controller 110, it is important to understand the activities that may be present in cloud ecosystem 100. The following foundational information may be viewed as a basis from which the present disclosure may be properly explained. Such information is offered for purposes of explanation only and, accordingly, should not be construed in any way to limit the broad scope of the present disclosure and its potential applications.

Turning, again, to the infrastructure of FIG. 1, network 130 represents a series of points or nodes of interconnected communication paths for receiving and transmitting packets of information that propagate through the cloud ecosystem 100. Network 130 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 130 may also include one or more servers, firewalls, routers, switches, security appliances, antivirus servers, or other useful network devices, which in an example may be virtualized within an SDN. In this illustration, network 130 is shown as a single network for simplicity, but in some embodiments, network 130 may include a large number of networks, such as one or more enterprise intranets connected to the internet.

For ease of illustration, however, not all elements of FIG. 1 are depicted with communication lines traversing network 130. In network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., controller 110) and a destination node via network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Services 140 can be configured to provide system logs and metrics of the resources in data center 120 to controller 110. System metrics can include information related to or summarizing current system state and/or activity including, but not limited to, number of on-going client operations, current central processing unit (CPU) utilization, disk usage or load on the storage nodes, available network bandwidth, remaining disk input/output operations per second (IOPS), remaining disk bandwidth, etc. In at least one embodiment, these metrics can be pushed to the controller 110 by the metrics collectors in real-time. The controller 110 or services 140 may store the metrics in metrics repository 164, which may be internal to the controller 110 or external (entirely or in part). In other embodiments, services 140 may store real-time system metrics in the metrics repository 164 without accessing the controller 110.

In some cases, services 140 can be configured to log events and activities in data center 120 to controller 110. Logs can include information related to events, errors, device drivers, system changes, etc. In at least one embodiment, these logs can be pushed to the controller 110 by the services 140 in real-time. The controller 110 or services 140 may store the system logs in logs repository 160, which may be internal to the controller 110 or external (entirely or in part). In other embodiments, services 140 may store real-time system logs in the logs repository 160 without accessing the controller 110. In certain embodiments, a log may include entity and state pairings, or entity-state correlations.

Controller 110 can be implemented by one or more network elements in cloud ecosystem 100. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

In some embodiments, controller 110 leverages rules that have already been predefined for analyzing and reporting entity-state relationships. Phrased differently, controller 110 can decide which relationships or correlations might be more important or ought to have higher priority by learning from and interpreting the rules in an intelligent manner. In one example, controller 110 can rank correlations based on the rules (provided by the administrator or some other entity) represented as a graph identifying the best available current knowledge. As a result, the domain-specific knowledge and expertise that is "built in" to the rules are extrapolated and applied to ranking the most important or "actionable" correlations. In many cases, this can prioritize actions when there are multiple metrics showing a strong correlation at the same time.

Figure 2:
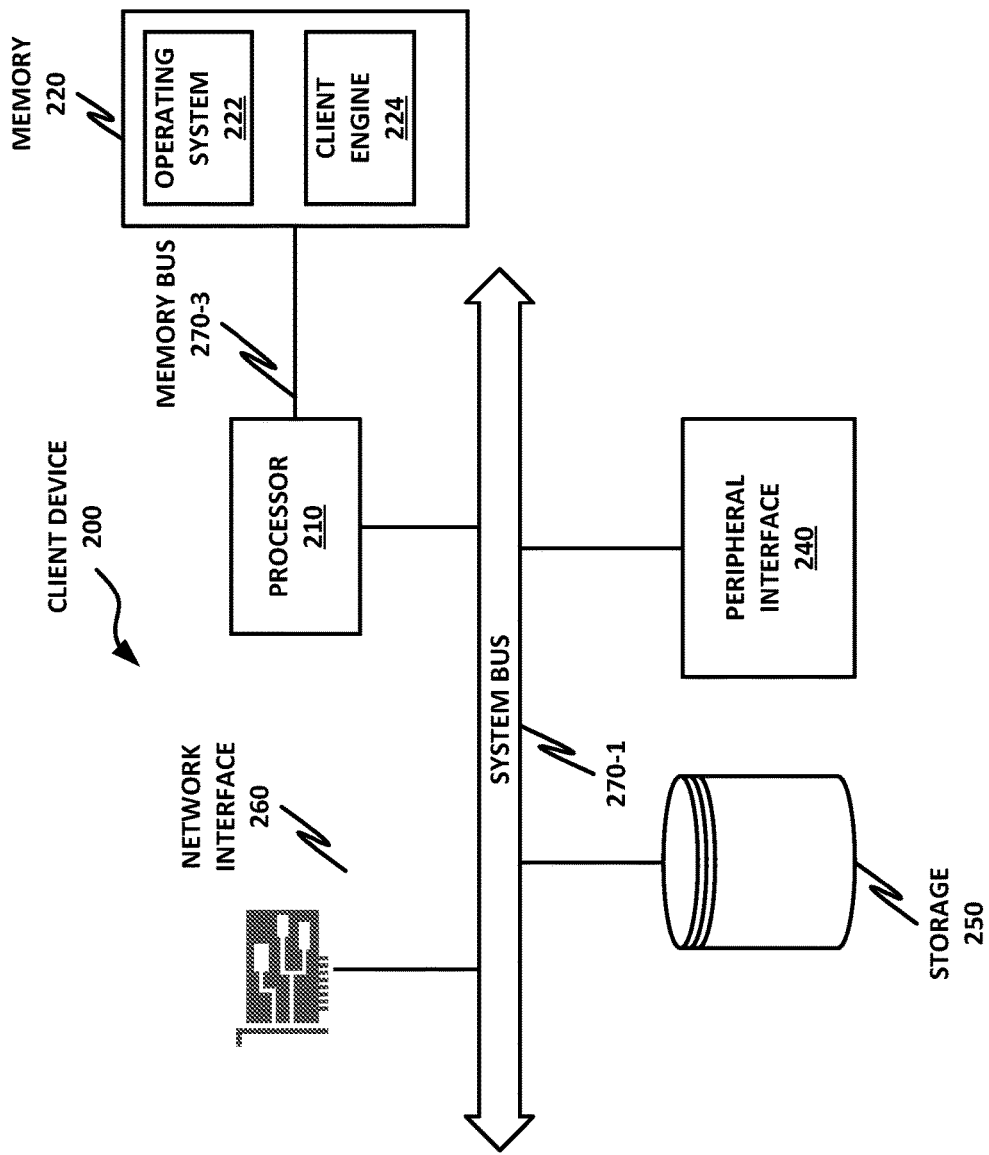
FIG. 2 is a block diagram of a client-class computing device, such as a user equipment (UE) or endpoint device, according to one or more examples of the present specification.

FIG. 2 is a block diagram of a client device according to one or more examples of the present specification. The client device may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host." In certain embodiments, UE 140 and administration console 150 may be examples of client devices.

Client device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus.

Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this specification.

Network interface 260 may be provided to communicatively couple Client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting Client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

In particular, client engine 224 may include an interface for receiving reports from a logging server, such as log collector 142 or controller 110. This may include one or more application programming interfaces (APIs) that interact with the logging server, receive notifications from the logging server, and display the notifications to a user, such as a system administrator. In an example, this may include displaying a human-readable graphical representation of a state-entity graph, as illustrated by way of nonlimiting example in FIG. 6.

Client engine 224 may also include an interface for a system administrator to access devices, such as a secure shell (ssh) interface into either physical machines (in a physical network) or a control panel for a hypervisor in an SDN, as illustrated in FIG. 4. Thus, client engine 224 may not only provide the system administrator with visibility into the state of the network, by receiving reported entity-state relationships from the logging server, but also may provide a facility for the administrator to act on those reports and to correct network devices or states as necessary.

Peripheral interface 240 may be configured to interface with any auxiliary device that connects to client device 200 but that is not necessarily a part of the core architecture of client device 200. A peripheral may be operable to provide extended functionality to Client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digial outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
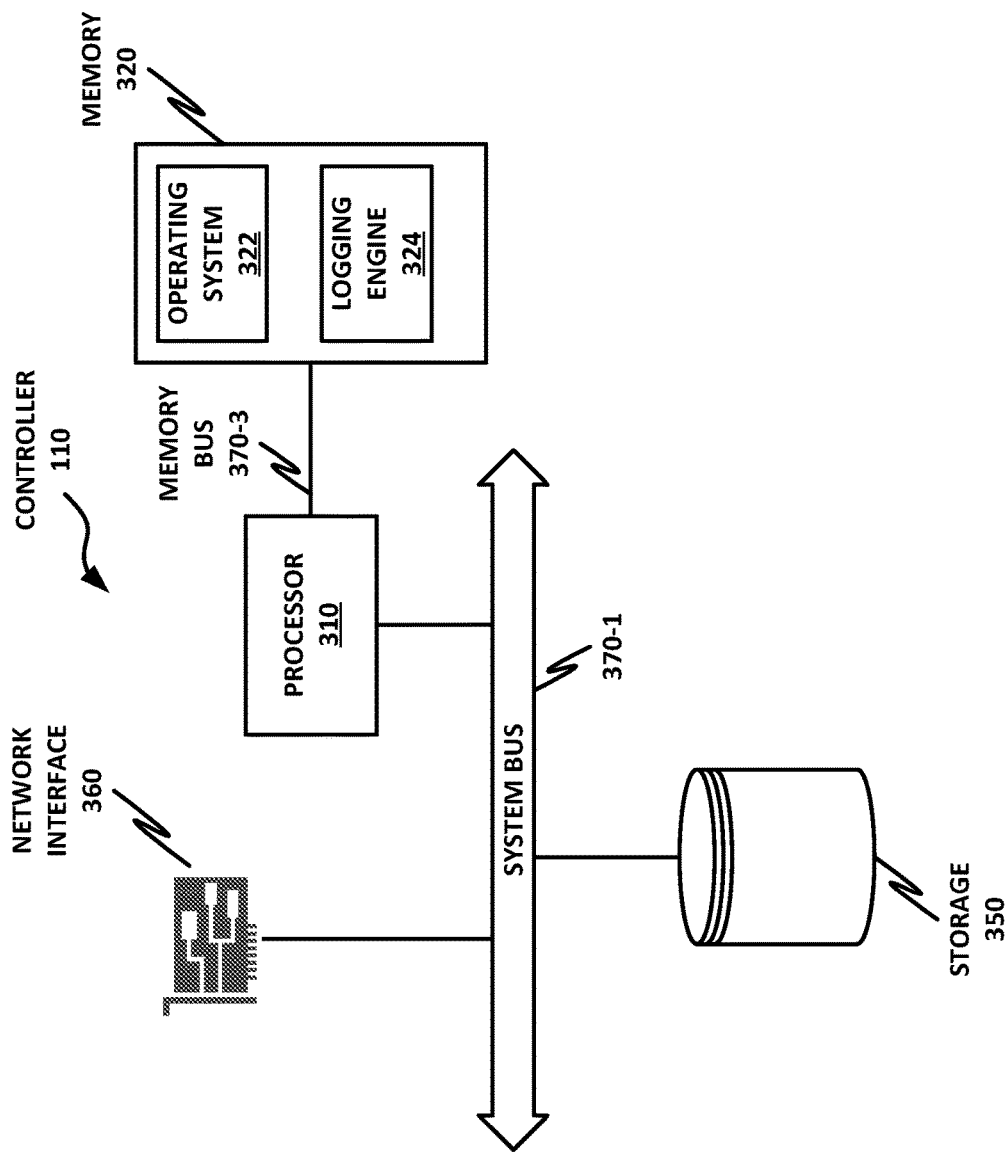
FIG. 3 is a block diagram of a server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein UE 140 provides certain localized tasks, while server 300 provides certain other centralized tasks. In contemporary practice, server 300 is more likely than UE 140 to be provided as a "headless" VM running on a computing cluster, or as a standalone appliance, though these configurations are not required.

In certain embodiments, controller 110, log collector 142, and data center resources may be embodied as server-class devices 300.

Server 300 includes a processor 310 connected to a memory 320, having stored therein executable instructions for providing an operating system 322 and at least software portions of a logging engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of logging engine 324.

Network interface 360 may be provided to communicatively couple server 140 to a wired or wireless network, and may include one or more logic elements as described in FIG. 2.

Logging engine 324 is an engine as described in FIG. 2 and, in one example, includes one or more logic elements operable to carry out computer-implemented methods as described in this specification. Software portions of logging engine 324 may run as a daemon process.

Logging engine 324 may include one or more non-transitory computer-readable mediums having stored thereon executable instructions operable to instruct a processor to provide a security engine. At an appropriate time, such as upon booting server 140 or upon a command from operating system 322 or a user or security administrator, processor 310 may retrieve a copy of logging engine 324 (or software portions thereof) from storage 350 and load it into memory 320. Processor 310 may then iteratively execute the instructions of logging engine 324 to provide the desired method.

FIG. 4 is a block diagram of a software-defined network 400. In some examples, the illustration of FIG. 4 may focus more on the functional aspects of SDN 400, while the illustration of FIG. 1 is more of a logical view of the network. It should be understood, however, that SDN 400 and network 100 of FIG. 1 may be the same network, or may be separate networks.

SDN 400 may include an SDN controller 410, a plurality of network devices 430, and a plurality of host devices 440. Some or all of SDN controller 410, network devices 430, and host devices 440 may be embodied as virtual machines running in a "cloud" environment, such as an OpenStack-compatible infrastructure.

SDN 400 is controlled by an SDN controller 410. SDN controller 410 is communicatively coupled to a plurality of network devices 430. Specifically, ND1 430-1, ND2 430-2, and ND5 430-5 are directly communicatively coupled to SDN controller 410. Network devices and ND3 430-3 and ND4 430-4 are not directly coupled to SDN controller 410, but rather coupled via the intermediate devices, such as ND2 430-2, and ND5 430-5.

Some network devices 430 also communicatively couple directly to host devices 440. Specifically, network device ND1 directly couples to host A 440-1, which has IP address 10.0.0.10, and MAC address FA:16:3:01:61:8. Network device ND2 430-2 directly couples to host B 440-2, which has IP address 10.0.0.20, and MAC address FA:16:3:01:63:B3. Network device ND5 430-5 directly couples to host D 440-3, which has IP address 10.0.0.30, and MAC address FA:16:3:01:54:83.

Network devices 430 may be configured to perform a variety of network functions, such as by way of nonlimiting example, load-balancing, firewall, deep packet inspection (DPI), DNS, antivirus, or any other suitable network function. The particular arrangement of interconnections between network devices 430 and from network devices 430 to host devices 440 may be determined by the particular network configuration and needs. Thus, the specific configuration of FIG. 4 should be understood to be an illustrative example only.

Each network device 430 may have a plurality of ingress and or egress interfaces, such as physical Ethernet ports. In an example, each interface may have a label or new name, such as P1, P2, P3, P4, P5, and so on. Thus, certain aspects of the network layout can be determined by inspecting which devices are connected on which interface. For example, network device ND1 430-1 has an ingress interface for receiving instructions and communicating with SDN controller 410. ND1 430-1 also has an interface P1 communicatively coupled to host A 440-1. ND1 430-1 has interface P2 that is communicatively coupled to ND2 430-2. In the case of ND2 430-2, it also couples to ND1 430-1 on its own interface P2, and couples to host B 440-2 via interface P1. ND2 430-2 communicatively couples to intermediate devices ND3 430-3 and ND4 430-4 via interfaces P3 and P4 respectively. Additional interface definitions are visible throughout the figure.

Figure 5:
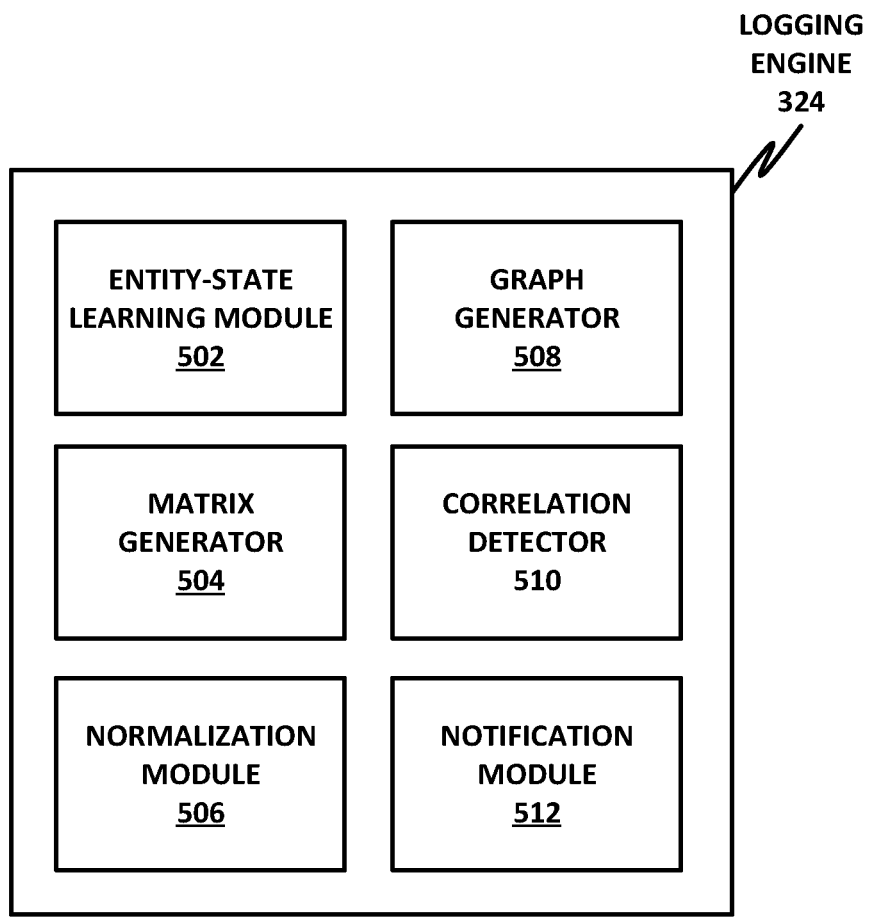
FIG. 5 is a block diagram of a logging engine according to one or more examples of the present specification.

FIG. 5 is a block diagram of a logging engine 324 according to one or more examples of the present specification. The various blocks disclosed herein are logical, and are not intended to require any strict division in either hardware or software. A single piece of software, for example, may have intermingled instructions that provide different parts of the disclosed blocks. However, in some embodiments, some or all of these blocks may be provided in discrete hardware, software, or firmware blocks or even as discrete virtual machines on a hypervisor.

In this example, logging engine 324 includes an entity-state learning module 502, a matrix generator 504, a normalization module 506, a graph generator 508, a correlation detector 510, and a notification module 512.

In an example, entity-state learning module 502 is configured to provide the functions of block 702 of FIG. 7, as described below.

In an example, matrix generator 504 is configured to provide the functions of block 704 of FIG. 7, as described below.

In an example, normalization module 506 is configured to provide the functions of block 706 of FIG. 7, as described below.

In an example, entity-state graph generator 508 is configured to provide the functions of block 708 of FIG. 7, as described below.

In an example, correlation detector 510 is configured to provide the functions of block 710 of FIG. 7, as described below.

In an example, notification module 512 is configured to provide the functions of block 712 of FIG. 7, as described below.

FIG. 6 is an example of an entity-state graph, according to one or more embodiments of the present specification. Logging engine 324 may generate a graph like this and display it in a human readable form so that the system administrator can dynamically visualize an object graph G(v,e), where the vertices (v) are entities and states, and there is an edge (e) between a state-entity pair if the associated score in the matrix is greater than 0. Note that in this example, the graph has no edges between entities or states themselves.

The edge weights specify the "ease of navigation" from an entity to a state. For example, suppose that entity "POST url://foo" 602 is associated with state "HTTP 200" 604 (a "positive" state, generally "OK"), having an edge weight of 2. Entity 602 also has an edge with state "HTTP 408" (a "negative" state indicating a request timed out), with and edge weight of 6. This graph may also include a negative null pointer 608, meaning for example that a program has terminated unsuccessfully. This is also a negative state. The resultant object graph signifies that entity 602 is more closely associated with state 606 ("HTTP 408") than state 604 ("HTTP 200"). Thus, the API call is "negatively" associated.

The matrix as a whole can be visualized to provide a system-wide overview of associations. However, a user may want to focus only on one entity, or a select group of entities or states to find out which other states/entities it is most strongly associated with. This narrow view could be visualized by a "star" or "hub-spoke" graph with the vertex of interest in the center and edges to the associated vertices. The higher the score, the more prominent the edge, which may be visually represented by edge thickness, color, or some other visible metric. Positive and negative associated edges or vertices may also be visualized separately, such as green for positive and red for negative.

Figure 7:
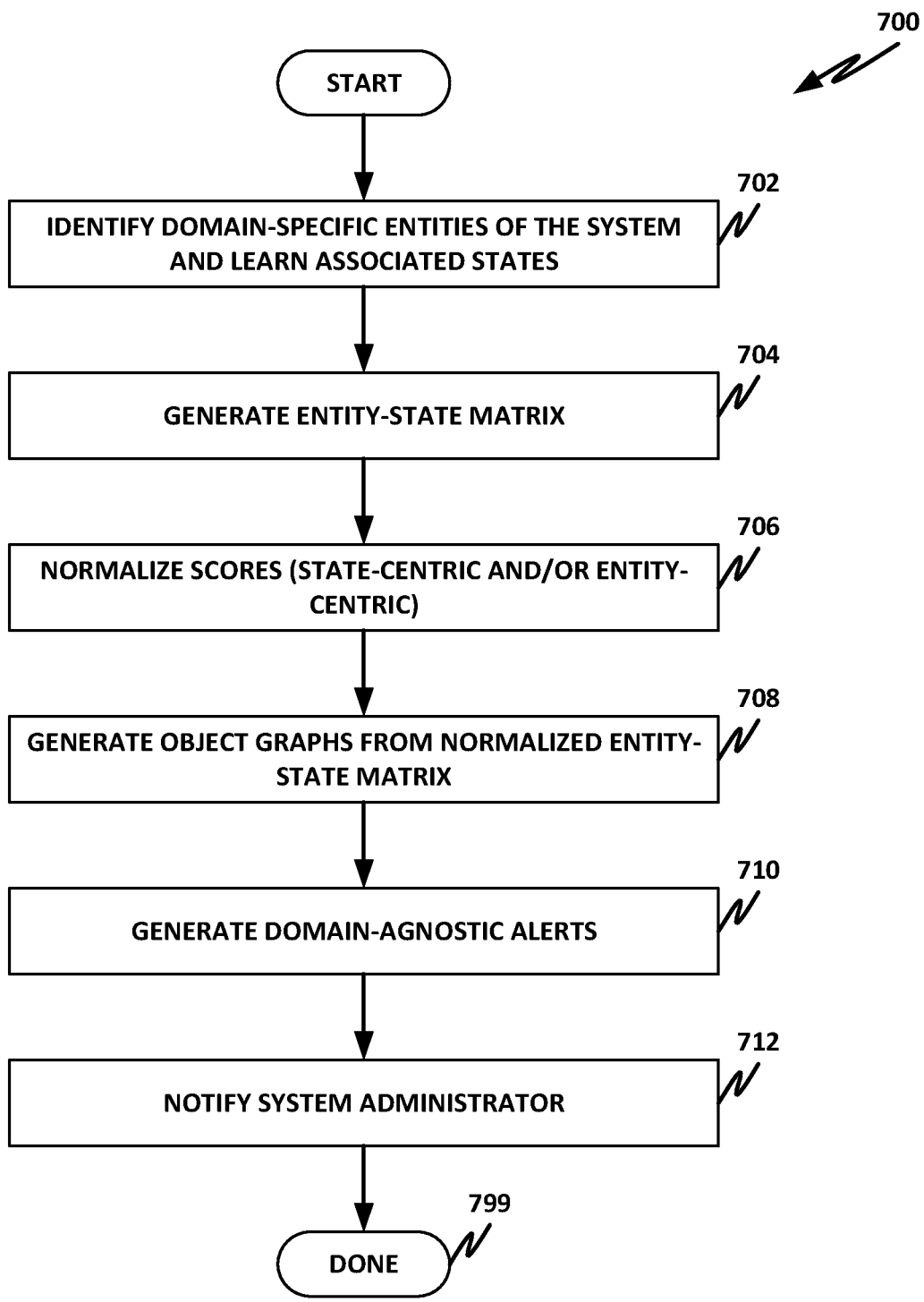
FIG. 7 is a flow chart of a method of providing entity-state relationship correlation according to one or more examples of the present specification.

FIG. 7 is a flow chart of a method 700 of providing logging according to one or more examples of the present specification.

In block 702, logging server 324 identifies domain-specific entities of the system and learns states associated with them. This may be accomplished, for example, by initially scanning existing logs and identifying a set of entities and states from each log entry. These may be provided in the respective entity and state vectors (e and s).

In block 704, logging engine 324 generates an entity-state matrix M=exs. In an example, entities and states can be associated or otherwise correlated by applying a "scoring" function over logs. The input function takes entities and states as parameters and outputs a positive integer as a score using, for example, the following combination of techniques:

a. Frequency of entities in a given time interval
  b. Co-occurrence count for all entities against the states
  c. Word distance between entities and states In block 706, based on the associations between entities (objects) and states (events), scores can be normalized to identify the relative strength of the correlation between entities and states. For example, correlations may be normalized to "entity-centric" (i.e., "What events happened to this entity?"), or "event-centric," (i.e., "What entities experienced this event?"), as follows.

For "entity-centric" normalization, process the matrix edge, row by row. The logging engine scales down the score values to real numbers between [0,1], where the maximum value is assigned the value 1 if it exists, otherwise all are assigned 0. Similarly, for "state-centric" normalization, process the state matrix, column by column, and map the values in the same way to the real interval [0,1].

For example, consider the following entity-state matrix M:

|        | State |    |    |    |    |
|--------|-------|----|----|----|----|
| Entity | S1    | S2 | S3 | S4 | S5 |
| E1     | 5     | 0  | 7  | 2  | 3  |
| E2     | 0     | 0  | 3  | 8  | 0  |
| E3     | 5     | 1  | 0  | 10 | 7  |

$M_S$ (normalized by state)

| | State | | | | |
|---|---|---|---|---|---|
| Entity | S1 | S2 | S3 | S4 | S5 |
| E1 | 0.5 | 0.0 | 0.7 | 0.1 | 0.3 |
| E2 | 0.0 | 0.0 | 0.3 | 0.4 | 0.0 |
| E3 | 0.5 | 1.0 | 0.0 | 0.5 | 0.7 |

$M_E$ (normalized by entity)

| | State | | | | |
|---|---|---|---|---|---|
| Entity | S1 | S2 | S3 | S4 | S5 |
| E1 | 0.3 | 0.0 | 0.4 | 0.1 | 0.2 |
| E2 | 0.0 | 0.0 | 0.3 | 0.7 | 0.0 |
| E3 | 0.2 | 0.1 | 0.0 | 0.4 | 0.3 |

In block 708, logging engine 324 generates a graph so that the system administrator can dynamically visualize an object graph G(v,e), where the vertices (v) are entities and states, and there is an edge (e) between a state-entity pair if the associated score in the matrix is greater than 0. Note that in this example, the graph has no edges between entities or states themselves. Additional details of such a graph are illustrated in FIG. 6.

In block 710, logging engine 324 provides a domain-agnostic alerting specification so that an administrator or DevOps can define alerts from the entity-state graph. The logging engine continuously updates the entity-state matrix while new log messages are detected in the system. In some embodiments, the frequency of updates can be flexibly specified by the system administrator.

The alert generation continuously observes changes in the entity-state matrix to determine if conditions are met to trigger an alert message. An alert message may be triggered when a sufficiently strong correlation is observed between an entity and a state (from either an entity-centric point of view, or from a state-centric point of view). In this context, "sufficiently strong" may mean that the correlation is "close" to 1, where "close" is defined as being within a specified threshold. The exact threshold will depend on the specific context. Depending on the context, "strong" may be as low as approximately 0.5. In other contexts, stronger correlations will be required before an alert is triggered. Other values for "strong" may include values equal to or greater than approximately 0.6, 0.7, 0.8, and 0.9. In other examples, concern may be raised when a positive correlation is too low (e.g., the entity is not reporting "success" sufficiently often). In those cases, the complements of the foregoing may be used. For example, a failure rate at or below 0.1, 0.2, 0.3, 0.4, or 0.5 may be deemed acceptable.

When a strong correlation is observed, in some cases the entity-state graph may be provided to a system administrator in a human-readable graphical form, such as the form disclosed by way of nonlimiting example in FIG. 6. This may provide an actionable alert. For example, if a strong negative correlation is observed for a specific entity, the network administrator may take action such as inspecting the node to determine if it is down or faulty.

In block 712, logging engine 324 notifies the system administrator, such as via an API connection to client engine 224. This may include providing the entity-state graph, which provides an actionable alert for the administrator.

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

What is claimed is:

1. A logging server computing apparatus comprising:
   a processor;
   a memory; and
   a logging engine, via the processor and/or the memory, configured to:
      analyze a network;
      build an entity-state matrix M from an entity vector e and a state vector s;
      determine that there is a strong correlation between an entity $e_c$ and a state $s_c$ based on one or more actionable rules, the strong correlation being a relationship correlation that is within a specified threshold; and
      report the strong correlation, via a display, to indicate whether the strong correlation is a strong positive correlation or a strong negative correlation, the strong correlation displayed via an entity-state graph with an actionable alert.

2. The computing apparatus of claim 1, wherein the logging engine is further configured to construct the entity-state graph.

3. The computing apparatus of claim 1, wherein reporting the strong correlation comprises providing the entity-state graph in a human-readable graphical form.

4. The computing apparatus of claim 1, wherein building the entity-state matrix comprises normalizing the entity-state matrix.

5. The computing apparatus of claim 4, wherein normalizing the entity-state matrix comprises constructing an entity-centric matrix $M_E$.

6. The computing apparatus of claim 4, wherein normalizing the entity-state matrix comprises constructing a state-centric matrix $M_S$.

7. The computing apparatus of claim 4, wherein determining the strong correlation comprises determining that a normalized vector value is close to 1 within a threshold.

8. The computing apparatus of claim 1, wherein determining the strong correlation comprises determining that there is the strong positive correlation.

9. The computing apparatus of claim 1, wherein determining the strong correlation comprises determining that there is the strong negative correlation.

10. The computing apparatus of claim 1, wherein the logging engine is further configured to rank correlations based on the one or more actionable rules.

11. A computer-implemented method of providing logging for a network, the method comprising:
analyzing, via a processor, the network;
building, via the processor, an entity-state matrix M from an entity vector e and a state vector s;
determining, via the processor, that there is a strong correlation between an entity $e_c$ and a state $s_c$ based on one or more actionable rules, the strong correlation being a relationship correlation that is within a specified threshold; and
reporting, via a display, the strong correlation to indicate whether the strong correlation is a strong positive correlation or a strong negative correlation, the strong correlation displayed via an entity-state graph with an actionable alert.

12. The method of claim 11, further comprising:
constructing the entity-state graph.

13. The method of claim 11, wherein reporting the strong correlation comprises providing the entity-state graph in a human-readable graphical form.

14. The method of claim 11, wherein building the entity-state matrix comprises normalizing the entity-state matrix.

15. The method of claim 14, wherein normalizing the entity-state matrix comprises constructing an entity-centric matrix $M_E$.

16. The method of claim 14, wherein normalizing the entity-state matrix comprises constructing an state-centric matrix $M_s$.

17. The method of claim 11, further comprising:
ranking correlations based on the one or more actionable rules.

18. One or more tangible, non-transitory computer-readable storage mediums having stored thereon executable instructions for providing a logging engine for:
analyzing a network;
building an entity-state matrix M from an entity vector e and a state vector s;
determining that there is a strong correlation between an entity $e_c$ and a state $s_c$ based on one or more actionable rules, the strong correlation being a relationship correlation that is within a specified threshold; and
reporting the strong correlation via a display to indicate whether the strong correlation is a strong positive correlation or a strong negative correlation, the strong correlation displayed via an entity-state graph with an actionable alert.

19. The one or more tangible, non-transitory computer-readable storage mediums of claim 18, wherein building the entity-state matrix comprises normalizing the entity-state matrix.

20. The one or more tangible, non-transitory computer-readable storage mediums of claim 18, wherein normalizing the entity-state matrix comprises constructing an entity-centric matrix $M_E$ or a state-centric matrix $M_s$.

* * * * *